(12) United States Patent
Umezurike

(10) Patent No.: US 12,335,260 B2
(45) Date of Patent: **\*Jun. 17, 2025**

(54) UNIFIED IDENTIFICATION VERIFICATION SYSTEM

(71) Applicant: Josiah Johnson Umezurike, Columbia, SC (US)

(72) Inventor: Josiah Johnson Umezurike, Columbia, SC (US)

( * ) Notice: Subject to any disclaimer, the term of this patent is extended or adjusted under 35 U.S.C. 154(b) by 181 days.

This patent is subject to a terminal disclaimer.

(21) Appl. No.: 18/193,538

(22) Filed: Mar. 30, 2023

(65) Prior Publication Data

US 2023/0247022 A1     Aug. 3, 2023

Related U.S. Application Data

(63) Continuation-in-part of application No. 16/697,157, filed on Nov. 26, 2019, now Pat. No. 11,367,065, which is a continuation of application No. 16/393,956, filed on Apr. 24, 2019, now Pat. No. 10,999,276, which is a continuation of application No. 15/875,378, filed on Jan. 19, 2018, now Pat. No.
(Continued)

(51) Int. Cl.
    *H04L 9/40*      (2022.01)

(52) U.S. Cl.
    CPC ...... *H04L 63/0876* (2013.01); *H04L 63/0823* (2013.01); *H04L 63/0861* (2013.01); *H04L 63/102* (2013.01)

(58) Field of Classification Search
CPC ............. H04L 63/0876; H04L 63/0823; H04L 63/0861
See application file for complete search history.

(56) References Cited

U.S. PATENT DOCUMENTS

| 8,966,609 B2 * | 2/2015 | Lee ...................... H04L 63/1458 |
| | | 713/153 |
| 10,164,779 B2 * | 12/2018 | Uhr ....................... G06F 16/2246 |

(Continued)

OTHER PUBLICATIONS

Josiah J_ Umezuricke et al., LokChainTM WhitePaper, Interconnection of the future Mobile, Blockchain and IoT. Nov. 30, 2018.
(Continued)

*Primary Examiner* — Iral S Lakhia
(74) *Attorney, Agent, or Firm* — GIBRALTAR CONSULTING LLC; Tariq S. Najee-Ullah

(57) ABSTRACT

A system includes a processor of an ID verification node connected to at least one web server node over a network and a memory on which are stored machine-readable instructions that when executed by the processor, cause the processor of the ID verification node connected to at least one node over a network; a memory on which are stored machine-readable instructions that when executed by the processor, cause the processor to: acquire verifiable ID scan image data of all users within a country of residence; receive users' profile data; generate encrypted user profile attributes comprising DNA; execute a transaction to store the encrypted user profiles on a ledger along with corresponding access policies; and generate an intermediate representation for each user based on the verifiable ID scan image data and the encrypted user profile attributes.

13 Claims, 7 Drawing Sheets

Related U.S. Application Data 10,911,217, and a continuation of application No. 13/364,339, filed on Feb. 2, 2012, now abandoned.

(56) References Cited

U.S. PATENT DOCUMENTS

| | | | |
|---|---|---|---|
| 10,348,484 B2 | 7/2019 | King | |
| 10,594,484 B2 * | 3/2020 | Rodriguez | H04L 9/0861 |
| 10,601,585 B1 | 3/2020 | Robinson et al. | |
| 10,749,681 B2 | 8/2020 | Andrade | |
| 10,756,883 B2 * | 8/2020 | Brehmer | G06F 40/174 |
| 10,902,140 B2 * | 1/2021 | Bhatnagar | G06F 16/2379 |
| 10,956,614 B2 | 3/2021 | Daniel et al. | |
| 10,972,280 B2 * | 4/2021 | Allen | H04L 9/3236 |
| 11,025,610 B2 * | 6/2021 | Dasika Venkata Devi | H04L 63/0823 |
| 11,032,293 B2 * | 6/2021 | Biyani | H04L 63/126 |
| 11,057,366 B2 * | 7/2021 | Avetisov | H04L 67/141 |
| 11,102,008 B2 * | 8/2021 | Maher | H04L 9/085 |
| 11,271,908 B2 * | 3/2022 | Soundararajan | H04L 9/0643 |
| 11,438,338 B2 * | 9/2022 | Gulbrandsen | H04L 9/50 |
| 11,497,557 B2 * | 11/2022 | Haslam | G06T 7/0012 |
| 11,866,007 B2 * | 1/2024 | Hassani | H04L 9/3213 |
| 2017/0109744 A1 | 4/2017 | Wilkins et al. | |
| 2017/0206532 A1 * | 7/2017 | Choi | G06Q 30/02 |
| 2017/0317833 A1 | 11/2017 | Smith et al. | |
| 2018/0013567 A1 | 1/2018 | Davis | |
| 2018/0060860 A1 | 3/2018 | Tian et al. | |
| 2018/0089041 A1 | 3/2018 | Smith et al. | |
| 2018/0115413 A1 | 4/2018 | King | |
| 2018/0225466 A1 | 8/2018 | Ducatel et al. | |
| 2018/0225469 A1 | 8/2018 | Daniel et al. | |
| 2019/0228407 A1 | 7/2019 | Wu | |

OTHER PUBLICATIONS

Notice of Allowance dated Oct. 27, 2021 issued in U.S. Appl. No. 16/697,157.

* cited by examiner

UNIFIED IDENTIFICATION VERIFICATION SYSTEM

RELATED APPLICATIONS

This application is a Continuation-In-Part of U.S. application Ser. No. 16/697,157 filed Nov. 26, 2019, which issued on Jun. 21, 2022 as U.S. Pat. No. 11,367,065 titled "Distributed Ledger System for Electronic Transactions"; which is a continuation of U.S. application Ser. No. 16/393,956 filed on Apr. 24, 2019, which issued as U.S. Pat. No. 10,999,276 titled "Industrial Internet Encryption System"; Patent '065 is also a continuation of U.S. application Ser. No. 15/875,378 filed on Jan. 19, 2018, which issued as U.S. Pat. No. 10,911,217 titled "Endpoint-to-Endpoint Cryptographic System for Mobile and IoT Devices"; Patent '276 is also claims priority to U.S. Non-Provisional application Ser. No. 13/364,339 filed Feb. 2, 2012, which are hereby incorporated by reference herein in its entirety.

It is intended that each of the referenced applications may be applicable to the concepts and embodiments disclosed herein, even if such concepts and embodiments are disclosed in the referenced applications with different limitations and configurations and described using different examples and terminology.

TECHNICAL FIELD

This present disclosure generally relates to security systems, and more particularly, to verification of identity of users, IoT devices, etc.

BACKGROUND

A typical identification (ID) card includes information about the cardholder such as name, address, a physical description, and picture. Most ID cards also contain some sort of machine-readable identifier such as a magnetic stripe, a bar-code, QR code, a smart chip, etc. The ID cards are typically used to restrict access for unauthorized cardholders. For example, laws in every state require a person to be at least a minimum age to purchase alcohol or tobacco products. Similarly, in most states, a patron must be at least a minimum age to enter a bar. Typically, to verify that a person meets age requirements, the person must present an ID card prior to purchasing products or prior to being admitted to an establishment having age requirements.

There are numerous problems with using ID cards for the purposes mentioned above. One problem relates to fake or altered ID cards. It is very common for under age people to obtain fake or altered ID cards that show that the cardholder meets a minimum age requirement. In addition, it is common for under age people to use a valid ID card belonging to someone else. The quality of many fake or altered ID cards is such that it is extremely difficult to distinguish or determine the validity of an ID card.

Another problem relating to the ID cards is that it is cumbersome to verify their authenticity. For example, when a law-enforcement officer verifies the validity of an ID card, the officer typically gets on a radio and reads the ID number to a remote person who has the ability to verify the validity of the ID. This procedure is labor intensive and time-consuming for the officer. These verification procedures may result in false positive or negative identifications.

The existing solution do not allow for verification of a person's name from an ID and vice versa—verification of the ID from the name itself. The conventional verification systems do not provide for an intermediate representation (QR code or any other string that connect the verifiable credential to the person) that may be used to check the name of person to verify if it is real.

Accordingly, an efficient and accurate system for verification of identity of users, IoT devices, supply chain of electronics, etc. is desired.

SUMMARY

One embodiment provides a processor and memory of an ID verification node configured to acquire verifiable ID scan image data of all users within a country of residence; receive users' profile data; generate encrypted user profile attributes including DNA; execute a transaction to store the encrypted user profiles on a ledger along with corresponding access policies; and generate an intermediate representation for each user based on the verifiable ID scan image data and the encrypted user profile attributes.

Another embodiment provides a method that includes one or more of acquiring verifiable ID scan image data of all users within a country of residence; receiving users' profile data; generating encrypted user profile attributes including DNA; executing a transaction to store the encrypted user profiles on a ledger along with corresponding access policies; and generating an intermediate representation for each user based on the verifiable ID scan image data and the encrypted user profile attributes.

DETAILED DESCRIPTION

Figure 1:
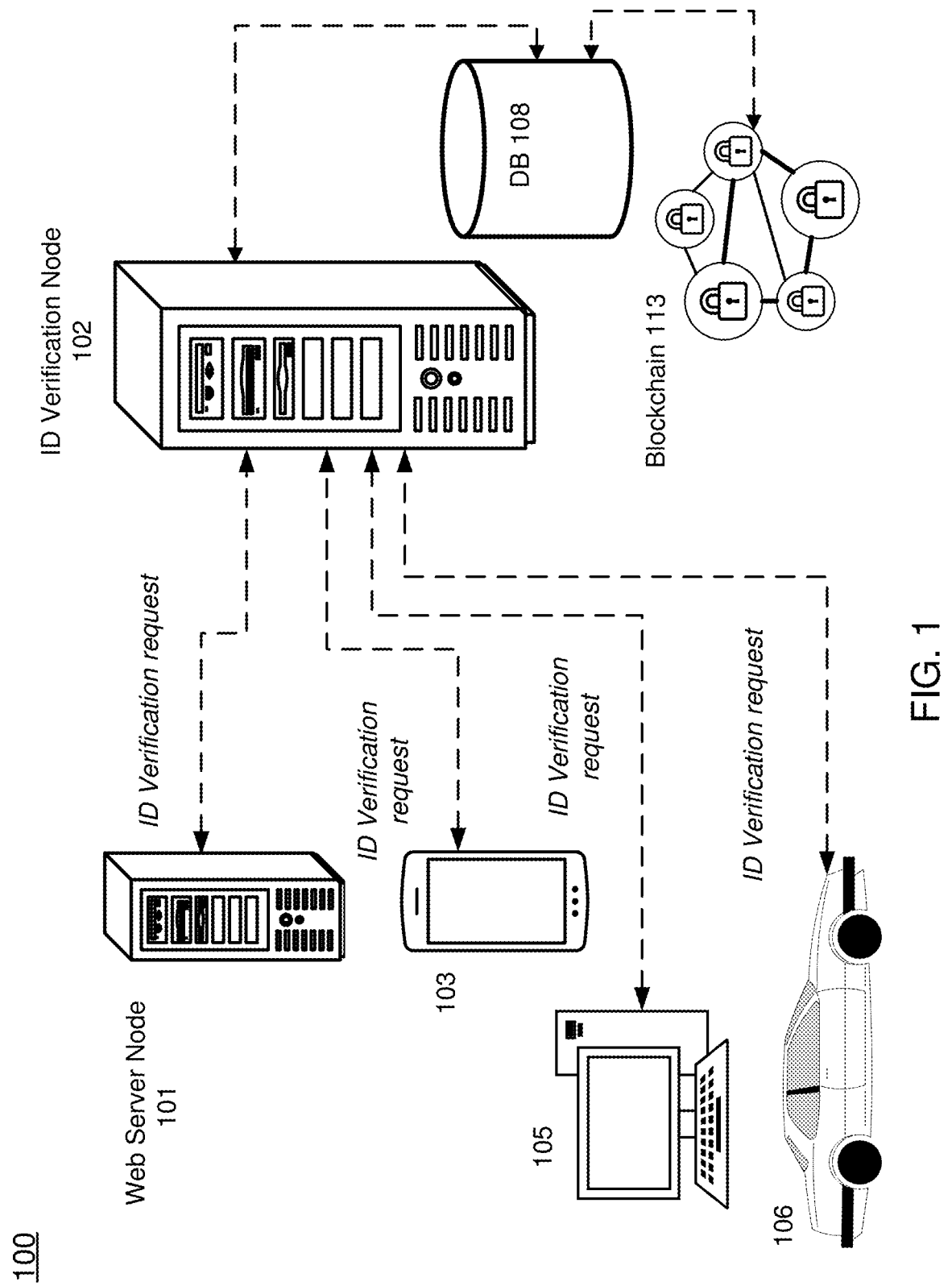
FIG. 1 illustrates a network diagram of a system 100 including an ID verification server node and nodes that require ID verification, according to disclosed embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the present disclosure as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Disclosed embodiments provide methods, systems, components, non-transitory computer readable media, devices, and/or networks, which provide for a Universal Identification Verification system (UIVS) that covers individuals, IoT devices, supply chain of electronics, etc.

In one embodiment, veryfID and DsTC proprietary application are used to scan all IDs of users in any country using a supported API. The user encrypted profiles attributes including DNA or UWA number may be sent to a proprietary database with the right policies for access. Verifiable credentials and other attributes of the user profile may be turned into an intermediate representation. In one embodiment, a digital phone book or Digital Data Nucleic Authority (DDNA) may be created on a portal veryfID.name for the entire world to see whose ID is genuine based on their country and interests.

Power exchange and commerce using this ID solve ware with a distributed ledger technology (DLT) or a blockchain may be used for implementing interoperation. For example, if a user wants to send anything to someone, the user can just look up a target person by a phone number or an email address in the DDNA to get the exchange mode (e.g., M3UWA) as well as a unique QR code to adopt the needed details to send money or share things with the target person. Since anything is now possible on the Internet, it is critical for a user to know who he is dealing with on another end of communications. The disclosed embodiments, advantageously, solve identification issues by interfacing a user device, a VC, a person and an advanced authentication.

The proposed universal system for verification of identity may employ the following:

Decentralized sTrueDid for communication (DsTC) and distributed ledger system for e-transactions (DLSeT). The DLSeT platform can include a serverless operating system with both public, private and consortium distributed ledgers that utilize a Lattice Face Secret Key Infrastructure (LFSKI) feature that is distinct to the platform.

The DLSeT platform, employing a secret key infrastructure (SKI), can realize advantages over many existing blockchain platforms based on a public key infrastructure (PKI), being able to deliver safe and efficient transactions in a decentralized manner. The DLSeT platform includes a distributed ledger, which maintains secure, and immutable records of all transactions conducted on the platform.

The distributed ledger can be configured, at least partially, as a cryptographic infrastructure in a blockchain network. This allows the distributed ledger aspects of the DLSeT platform to act as an encrypted storage enclave for e-transactions. Furthermore, the DLSeT platform utilizes a user's attributes of users that typically does not change often over time (e.g., biometric data, driver license number, etc.) that can be further used to create an encrypted and unique Data Nucleus Aggregator (DNA) for the user. It is a user's DNA that is employed during e-transactions on the DLSeT platform, providing a layer of anonymity and added security for users. By collecting a plurality of different DNAs corresponding to different users, the DLSeT platform creates a silo of the DDNA for its nodes.

The data of the DDNA serves as the building block for implementing LFSKI. Nodes participating in e-transactions via the DLSeT platform use LFSKI, which requires no private of public keys that are susceptible to hackers and other security. Thus, the DLSeT platform using LFSKI realizes privacy, security (e.g., encryption 2048 bits), quantum computing resistance and a secure data life cycle. Also, the DLSeT platform can utilize a consensus protocol, namely a prove of simple universe wallet address (Po (SuA)), which allows only authorized users of the platform to securely transact. Moreover, the DLSeT platform may be configured to allow each user to identify themselves prior to an interaction, with use of a Zero Knowledge Triangle Flow (ZT-Flow) protocol. The ZT-Flow protocol allows the platform to have a trustless framework, where each user involved in a transaction can be identified while performing financial transactions, legitimately with integrity and confidentiality. In addition, the DLSeT platform is configured to use a data life cycle security (DLCs). The DLCs allows users to control their own data, for instance deciding when to monetize their data, or end the life cycle of their data, as desired. The DLCs ensures that only users involved in the transaction can share the data, or have the capability to access their owned data. Accordingly, no other party is allowed to be involved in, or impart a decision on, in the life of the data.

In one or more embodiments, the current Lattice face keyless infrastructure (LFKI) may be implemented as follows: Lattice face keyless infrastructure (LFKI) permeates a browser engine that uses identity components for securing information by encrypted verification, validation, and evaluation via ECSMID. A decentralized application with a decentralized security is created, all entities requiring authentication no longer must, reuse, move, store, and manage keys. This makes it highly possible to create a browser to uphold protocols like ECSMID, Zero-Trust, Zero-knowledge Flow, sTrueDID, UWA into a single decentralization application called AFA browser with support to client (nodes) and server (nodes). All entities in the keyless infrastructure can exist as standalones while retaining autonomy over their data. This has a high potential of preserving privacy and securing all information on the internet. Encrypted searches (homomorphic encryption) could be done via keywords. Resulting output could be decrypted following an exchange mechanism of batter, biding and prefixed pricing for any PII (biographic and demographic data). —These are the necessary component of what we call Cyberlockx (AFA) browser on the internet.

The disclosed UIVS may use policies-permissions-roles and name and UWA verification. An artificial intelligence/machine learning (AI/ML) module may be used for generation of the intermediate representation.

The disclosed embodiments formulate conversion of physical object into intermediate representation in the digital space. This creates immutable record using cryptography from ECSMID disclosed in the U.S. Pat. No. 10,911,217 B1.

The template of policies defining user roles may be employed. A portal where users can verify name, UWA and other data nucleus aggregates is provided. This establishes unique identifiers for eFRI or digital finger prints then notifies the users if something goes wrong with each DNA.

According to one embodiment, a user can verify a name from ID and vice versa meaning the user can verify the ID from the name itself. For example, if there is a portal with intermediate representations (QR code or any other string that connect the verifiable credential to the person), the user can check the name of a person whether it is real using the portal. These credentials are public, but they are presented in a format that does not reveal anything online except for those that needed and are authorized to access it.

FIG. 1 illustrates a network diagram of a system 100 including entities requiring ID verification and an identification verification node, according to disclosed embodiments.

Referring to FIG. 1, an identification verification node 102 may be connected to entities requiring ID verification over a network. These entities may be a web server 101, a user smartphone (or tablet) 103, a personal computer 105, a car 106 or any IoT device (not shown).

In one embodiment, the identification verification node 102 may be connected to a database 108. In one embodiment, the UIVS database 108 may be a ledger of a blockchain 113. The identification verification node 102 may reside on a cloud. As discussed above, the distributed ledger 108 may be used for e-transactions DLSeT system.

In one embodiment, the identification verification node 102 may host DsTC and DLSet modules and may implement polices, permissions and roles of users and parties requesting verification. As discussed above, the identification verification node 102 may be configured to use keyless encryption. The identification verification node 102 may be configured to create immutable record using cryptography from ECSMID disclosed in the U.S. Pat. No. 10,911,217 B1. The template(s) of policies defining user roles may be stored on the UIVS database ledger DB 108. The identification verification node 102 may provide a portal where users can verify name, UWA and other data nucleus aggregates. The identification verification node 102 may establish unique identifiers for eFRI or digital finger prints and may send notifications to the users if something goes wrong with each DNA.

Figure 2:
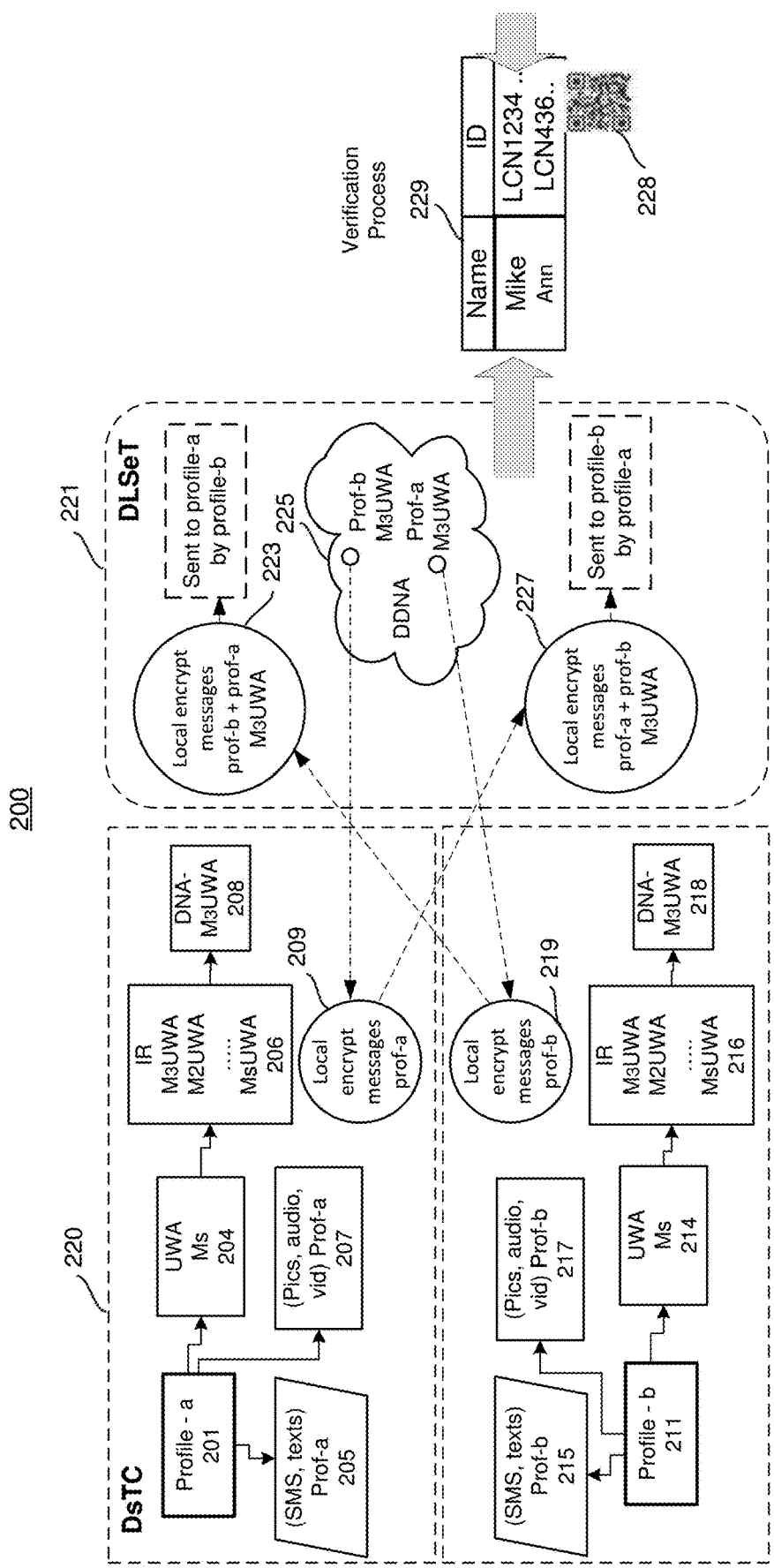
FIG. 2 illustrates a Universal Identification Verification System (UIVS), in accordance with embodiments of the present invention.

FIG. 2 illustrates a UIVS architecture 200, according to the disclosed embodiments.

Referring to FIG. 2, UIVS architecture includes DsTC module 220 and DLSet module 221. The DsTc may use two user profiles—profile-a (201) and profile-b (211). Each of the profiles may have respective SMS, texts (205 and 215). Each of the profiles 201 and 211 may have associated audio, video, picture data (207 and 217 respectively). The profiles 201 and 211 may have associated UWA Ms 204 and 214. MsUWA data 206 and 216 may be used to generate DNA M3 UWA (208 and 218 respectively). Local encrypted messages of profiles (209 and 219) are recorded as local encrypted messages sent to profile-a by profile-b (223) and as local encrypted messages sent to profile-b by profile-a (227) on DLSeT module. The DDNA 225 may be connected to the local encrypted messages of profile-a and profile-b (209 and 219). The verification process 229 may be then implemented to verify user names based on the IDs or vice versa using encrypted profiles including DNA or UWA number stored in the UIVS database with the right policies for access. The intermediate representation such as a QR code 228 may be generated and used for verification of the IDs. The QR code may connect the verifiable credential to the person. It may be used to check the name of a person to verify if it is real.

Figure 2A:
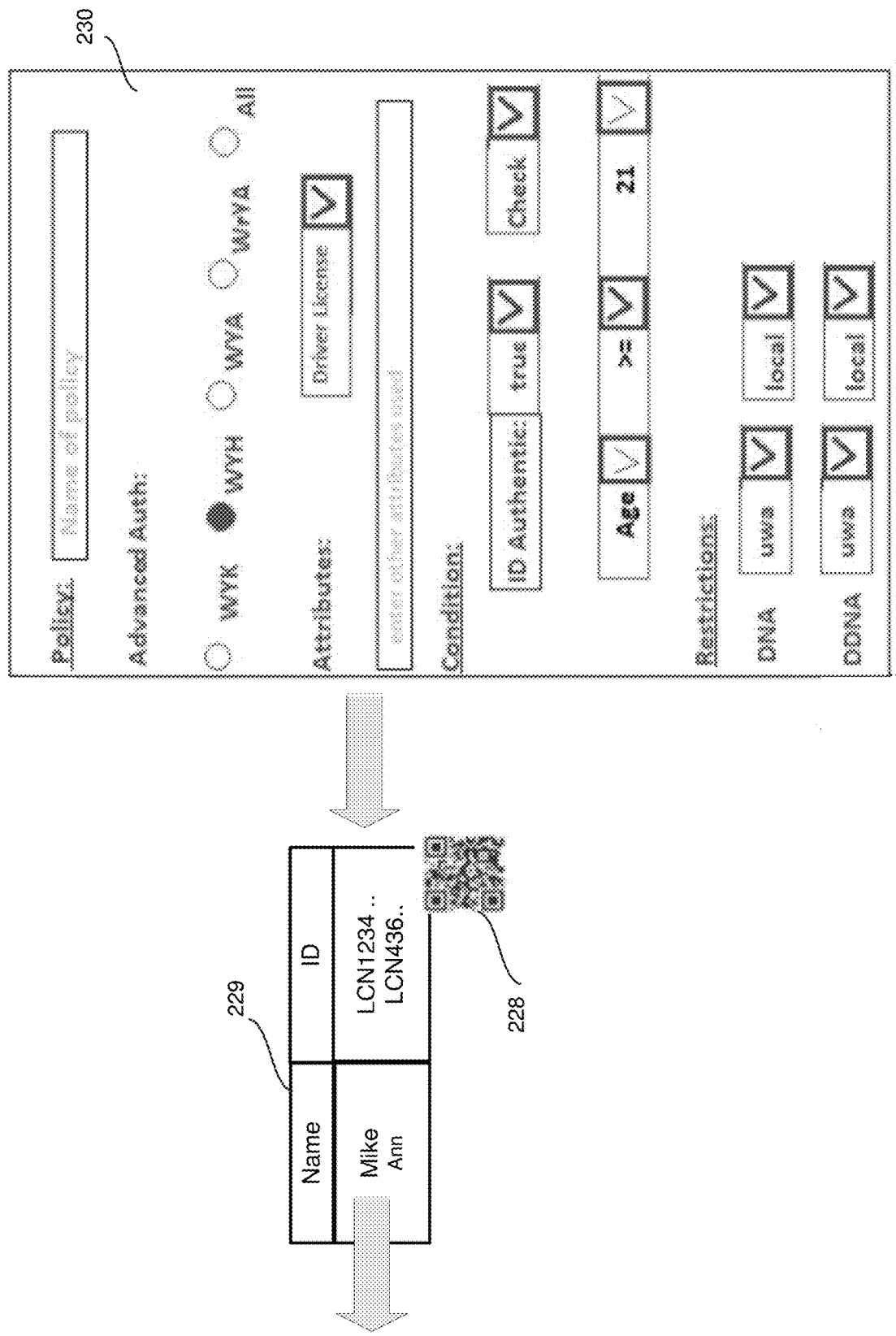
FIG. 2A illustrates a user interface for providing data to the Universal Identification Verification System (UIVS), in accordance with embodiments of the present invention.

FIG. 2A illustrates a user interface that may be used with the UIVS architecture, according to the disclosed embodiments.

Referring to FIG. 2A, UIVS architecture includes a user interface 230 that is connected to the system 200 in FIG. 2. As discussed above, the verification process 229 may be then implemented to verify user names based on the IDs or vice versa using encrypted profiles including DNA or UWA number stored in the UIVS database 108 (FIG. 1) with the right policies for access. The intermediate representation such as a QR code 228 may be generated and used for verification of the IDs. The QR code may connect the verifiable credential to the person. It may be used to check the name of a person to verify if it is real.

The user may enter data via the interface 230. The data may be associated with categories such as what you know (WYK), what you have (WYH), what you are (WAY) and where you are (WrYA). The user can enter attributes such as Driver License (or another valid ID) information. The user can enter age restrictions and true or false conditions for ID authenticity. The user can also set local restrictions for DNA and DDNA.

For example, in case of verification of a car identification, a registration document back and front may be scanned. For example, car VIN #image may be used. Then, car front and back license plate images showing the car may be used. Images of the car sides—passenger and driver side showing full doors and body may be used. Owner name may be extracted and matched with the VIN #on in the image.

Then, all to documents including images of the car, name on the DL and on the car registration may be linked. The contact name on the DL and on the registration are used to create car UWA. The 45 digit long alphanumeric special character string that start with capital letter LCN is generated. The string may be, for example:

4DOM+Vin#+InitialFLname+Plate#+
Last5NumbersIMEI+Last7Address(google open).

Then, a shadow of the string is created. The payload functions, path, a QR code with a specific policy may be included. The authentication verification node may send the stripped shadow UWA to client. The client may use 11 chars of the 42 each time get or post/request to the server to perform a mutual authentication. Then, the server decrypts shadow UWA M6 to M5 to make certain it was not tampered with (i.e., it comes from a correct server). Otherwise, the exchange or authorization will not happen or will not be honored.

After authentication, the car generated QR code could be used to interact with other devices, such as a smartphone which has its own exchange identifier M3UWA or M3PIN as discussed in ECSMID described in the U.S. Pat. No. 10,911, 217 B1.

In one embodiment, a pre-arranged access control may be used based on the policy and advanced authentication of data submitted by the user. Once the user is logged in, he may follow the advanced authentication to complete his tasks. For example, a user who logged in with only a user name and password may not have the same privileges with another user who logged in with a user name, password and PIN or verified ID data. In one embodiment, based on the registration attributes supplied by a user, the user may have a set of privileges with permissions based on the profile attributes. This allows for efficient access control and access management. The user roles may be affected by the policies of the UIVS in accordance to the embodiments of the present invention.

Figure 3:
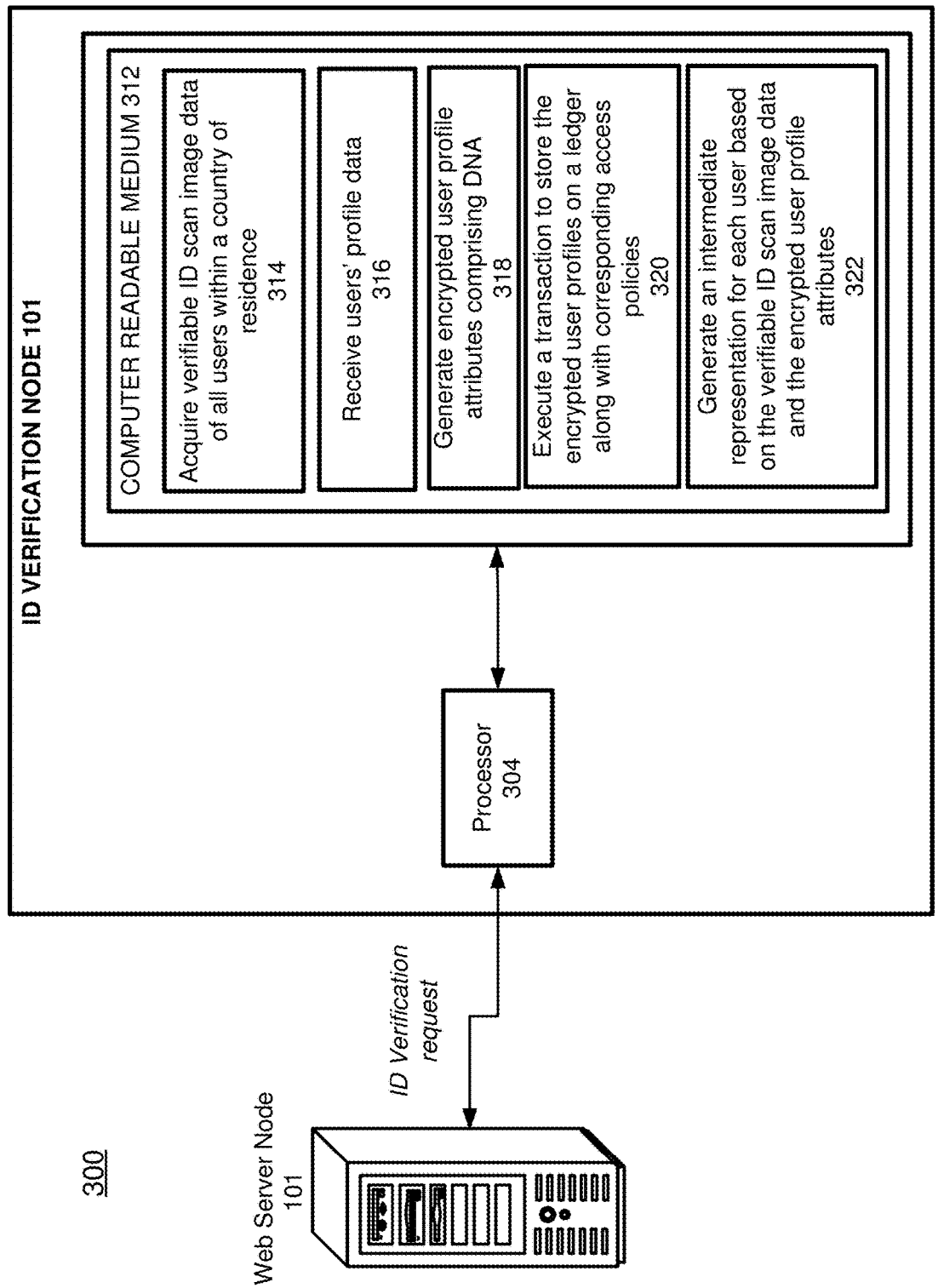
FIG. 3 illustrates an example network including details of the ID verification server node, in accordance with embodiments of the present invention.

FIG. 3 illustrates an example network including details of the ID verification server node, in accordance with embodiments of the present invention.

Referring to FIG. 3, the example network 300 includes the ID verification node 102 connected to a web server node 101 over a network. Other nodes such the ones depicted in FIG. 1 may be connected to the ID verification node 102. The ID verification node 102 may host the UIVS system including DsTC module and DLSet module depicted in FIG. 2 and discussed above. The ID verification node 102 may be configured to receive data from user interface 230 depicted in FIG. 2A. As discussed above, the ID verification node 102 may invoke veryfID and DsTC proprietary application to scan all IDs of users in any country using a supported API. The user encrypted profiles attributes including DNA or UWA number may be sent to a proprietary database or ledger with the right policies for access. Verifiable credentials and other attributes of the user profile may be turned into an intermediate representation. In one embodiment, a digital phone book or Digital Data Nucleic Authority (DDNA) may be created on a portal veryfID.name for the entire world to see whose ID is genuine based on their country and interests.

The ID verification node 102 may be a computing device or a server computer, or the like, and may include a processor 304, which may be a semiconductor-based microprocessor, a central processing unit (CPU), an application specific integrated circuit (ASIC), a field-programmable gate array (FPGA), and/or another hardware device. Although a single processor 304 is depicted, it should be understood that the ID verification node 102 may include multiple processors, multiple cores, or the like, without departing from the scope of the ID verification node 102 system.

The ID verification node 102 may also include a non-transitory computer readable medium 312 that may have stored thereon machine-readable instructions executable by the processor 304. Examples of the machine-readable instructions are shown as 314-322 and are further discussed below. Examples of the non-transitory computer readable medium 312 may include an electronic, magnetic, optical, or other physical storage device that contains or stores executable instructions. For example, the non-transitory computer readable medium 312 may be a Random-Access memory (RAM), an Electrically Erasable Programmable Read-Only Memory (EEPROM), a hard disk, an optical disc, or other type of storage device.

The processor 304 may fetch, decode, and execute the machine-readable instructions 314 to acquire verifiable ID scan image data of all users within a country of residence. The processor 304 may fetch, decode, and execute the machine-readable instructions 316 to receive users' profile data. The processor 304 may fetch, decode, and execute the machine-readable instructions 318 to generate encrypted user profile attributes comprising DNA. The processor 304 may fetch, decode, and execute the machine-readable instructions 320 to execute a transaction to store the encrypted user profiles on a ledger along with corresponding access policies. The processor 304 may fetch, decode, and execute the machine-readable instructions 322 to generate an intermediate representation for each user based on the verifiable ID scan image data and the encrypted user profile attributes.

Figure 4A:
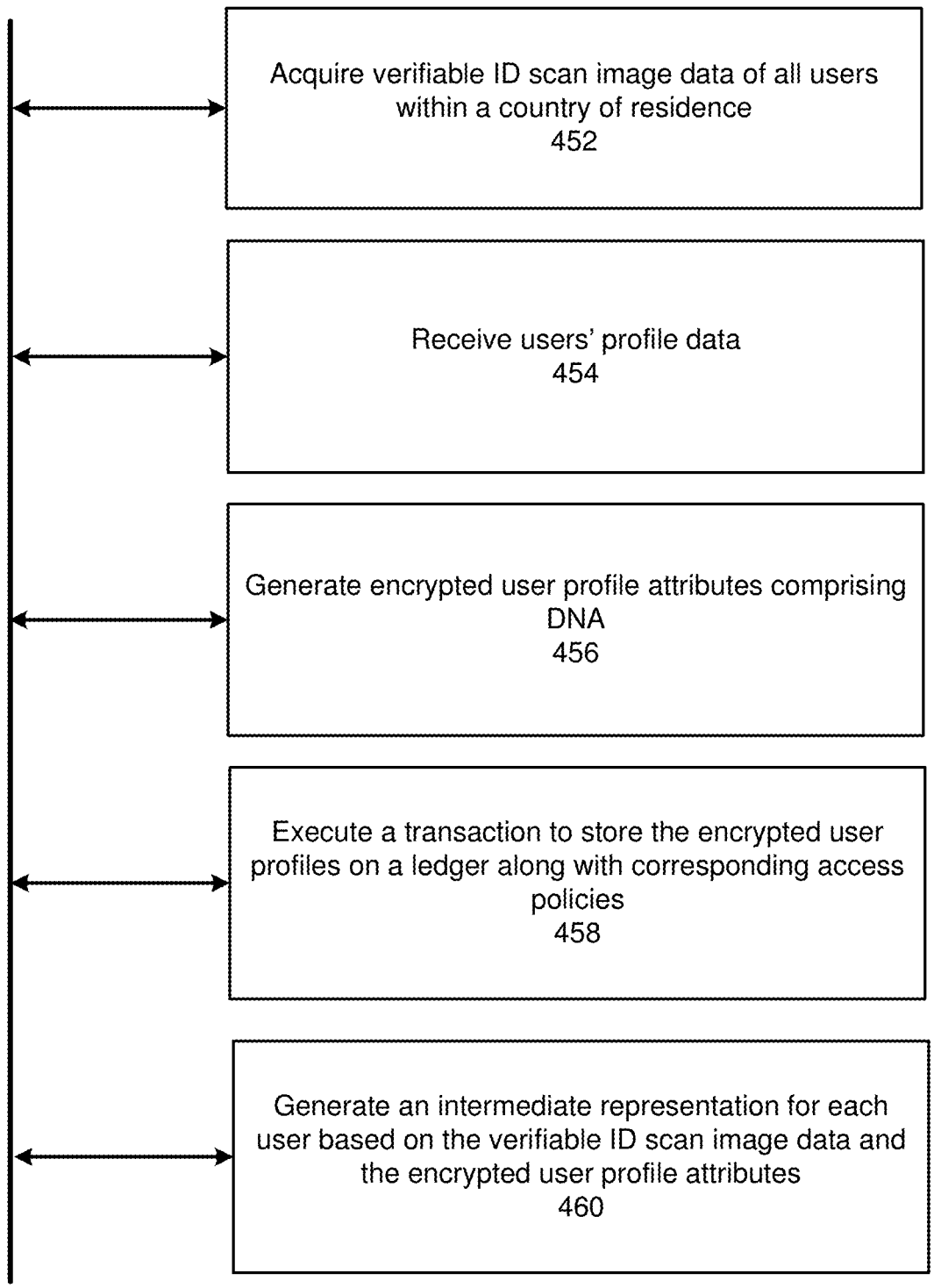
FIG. 4A illustrates a flow diagram of an example method, in accordance with embodiments of the present invention.

FIG. 4A illustrates a flow diagram 450 of an example method, according to disclosed embodiments. FIG. 4A illustrates a flow chart of an example method executed by the ID verification node 102 (see FIG. 1). It should be understood that the method 450 depicted in FIG. 4A may include additional operations and that some of the operations described therein may be removed and/or modified without departing from the scope of the method 450. The description of the method 450 is also made with reference to the features depicted in FIG. 3 for purposes of illustration. Particularly, the processor 304 of the ID verification node 102 may execute some or all of the operations included in the method 450.

Referring to FIG. 4A, the method 450 may also include one or more of the following steps. At block 452, the processor 304 may acquire verifiable ID scan image data of all users within a country of residence. At block 454, the processor 304 may receive users' profile data. At block 456, the processor 304 may generate encrypted user profile attributes comprising DNA. At block 458, the processor 304 may execute a transaction to store the encrypted user profiles on a ledger along with corresponding access policies. At block 460, the processor 304 may generate an intermediate representation for each user based on the verifiable ID scan image data and the encrypted user profile attributes.

Figure 4B:
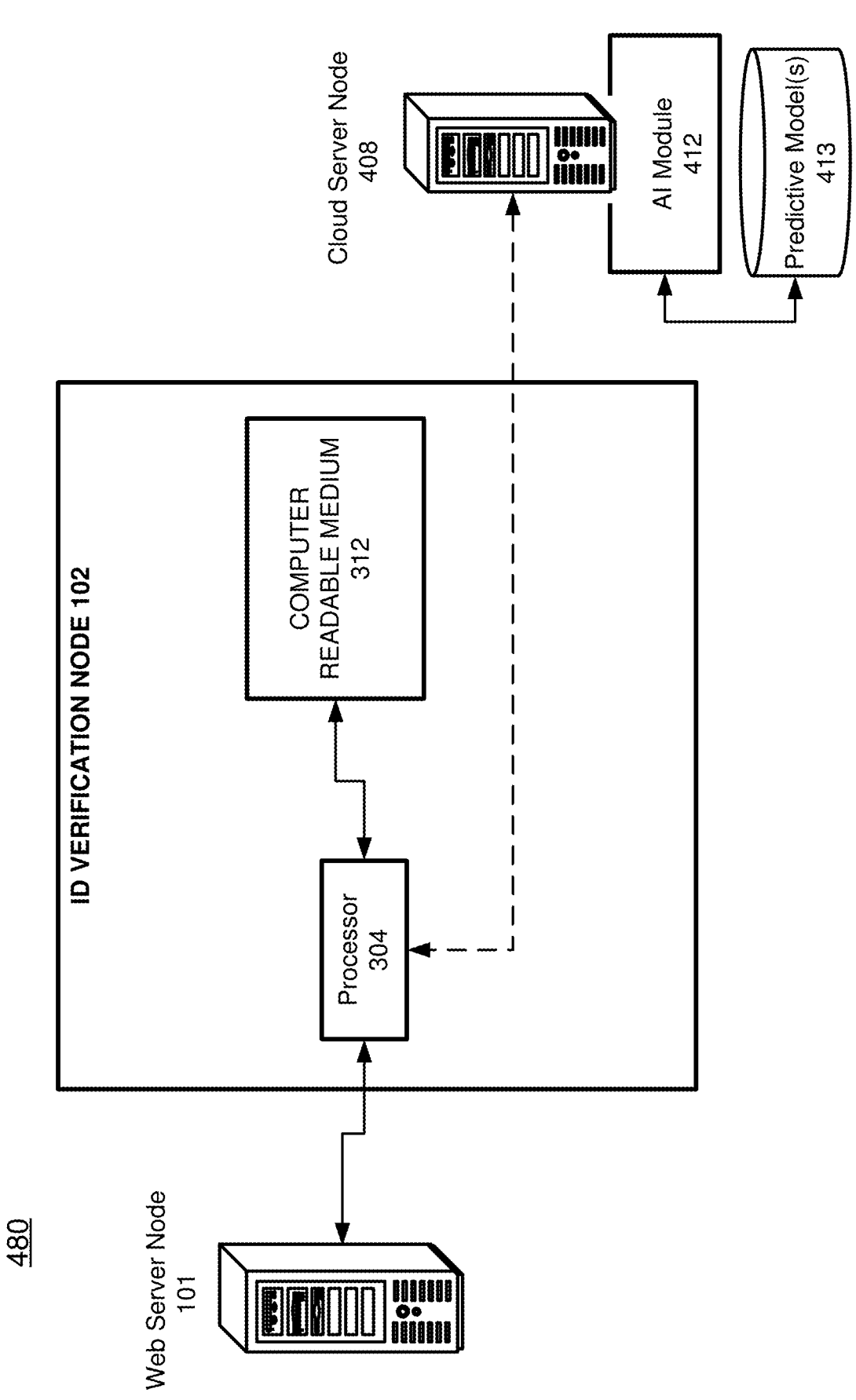
FIG. 4B illustrates a network used for the Universal Identification Verification System including an AI module, in accordance with embodiments of the present invention.

FIG. 4B illustrates a network 480 used for the Universal Identification Verification System including AI module for predictive inputs, in accordance with embodiments of the present invention.

As discussed above, an artificial intelligence/machine learning (AI/ML) module may be used for generation of the intermediate representation.

The intermediate representation (e.g., QR code) may be obtained by using predictive data analytics from an AI module 412 that compares user store user profile data and previously verified credentials. The AI module 412 may be executed on the ID verification node 102 or may reside on a cloud server node 408. The ID verification node 102 may use locally stored user profile attributes as well. The AI module 412 may generate predictive analytics model 413 which may process, for example, profile data provided by the UIVS. The analytical data may be stored on a ledger of a blockchain as a reliable audible log. While the AI module 412 may use data acquired form neural networks, it may also use some heuristics-related data stored on the ledger for predictive analytics.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 5 illustrates an example computer system/server node 500, which may represent or be integrated in any of the above-described components, etc.

Figure 5:
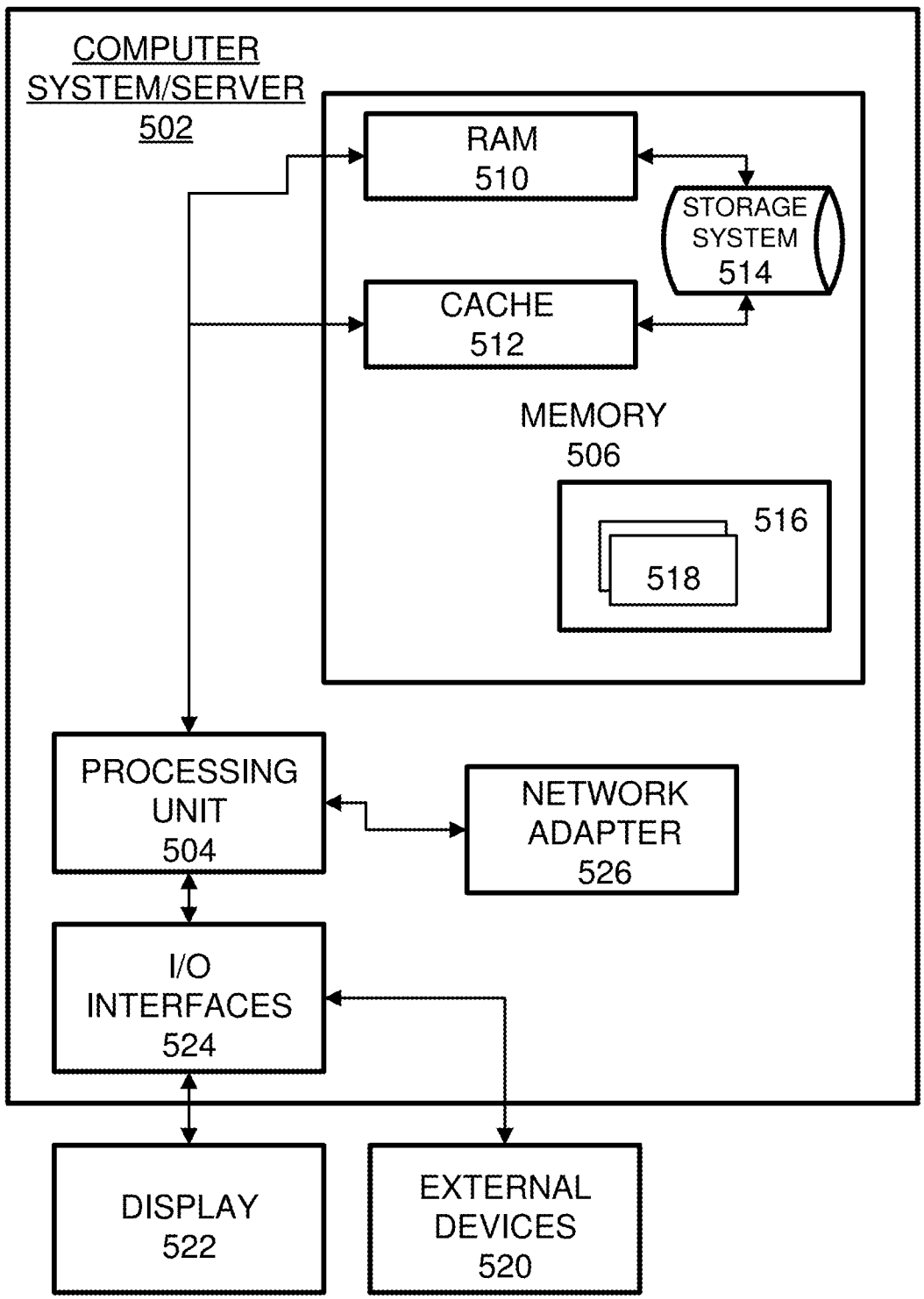
FIG. 5 illustrates an example computer system/server node, which may represent or be integrated in any of the components of the embodiments of the present invention.

FIG. 5 is not intended to suggest any limitation as to the scope of use or functionality of embodiments of the application described herein. Regardless, the computing node 500 is capable of being implemented and/or performing any of the functionality set forth hereinabove.

In the computing node 500 there is a computer system/server 502, which is operational with numerous other general purposes or special purpose computing system environments or configurations. Examples of well-known computing systems, environments, and/or configurations that may be suitable for use with computer system/server 502 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 502 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, the computer system/server 502 may be used in cloud computing node 900 shown in the form of a general-purpose computing device. The components of the computer system/server 502 may include, but are not limited to, one or more processors or processing units 504, a system memory 506, and a bus that couples various system components including system memory 506 to processor 504.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The exemplary computer system/server 502 typically includes a variety of computer system readable media. Such media may be any available media that is accessible by the computer system/server 502, and it includes both volatile and non-volatile media, removable and non-removable media. System memory 506, in one embodiment, implements the flow diagrams of the other figures. The system memory 506 can include computer system readable media in the form of volatile memory, such as random-access memory (RAM) 510 and/or cache memory 512. The computer system/server 502 may further include other removable/non-removable, volatile/non-volatile computer system storage media. By way of example only, storage system 514 can be provided for reading from and writing to a non-removable, non-volatile magnetic media (not shown and typically called a "hard drive"). Although not shown, a magnetic disk drive for reading from and writing to a removable, non-volatile magnetic disk, and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 906 may include at least one program product having a set (e.g., at least one) of program modules that are configured to carry out the functions of various embodiments of the application.

Program/utility 516, having a set (at least one) of program modules 518, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. Program modules 518 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

The computer system/server 502 may also communicate with one or more external devices 520 such as a keyboard, a pointing device, a display 522, etc.; one or more devices that enable a user to interact with computer system/server 502; and/or any devices (e.g., network card, modem, etc.) that enable computer system/server 502 to communicate with one or more other computing devices. Such communication can occur via I/O interfaces 524. Still yet, the computer system/server 502 can communicate with one or more networks such as a local area network (LAN), a general wide area network (WAN), and/or a public network (e.g., the Internet) via network adapter 526. As depicted, network adapter 526 communicates with the other components of computer system/server 502 via a bus. It should be understood that although not shown, other hardware and/or software components could be used in conjunction with computer system/server 502. Examples include, but are not limited to: microcode, device drivers, redundant processing units, external disk drive arrays, RAID systems, tape drives, and data archival storage systems, etc.

Although an embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, recipient or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a Smart phone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms, etc.) thereto.

What is claimed is:

1. A system, comprising:
   a processor of an ID verification node connected to at least one node over a network;
   a memory on which are stored machine-readable instructions that when executed by the processor, cause the processor to:
   acquire verifiable ID scan image data of all users within a country of residence;
   receive users' profile data;
   generate encrypted user profile attributes comprising DNA;
   execute a transaction to store the encrypted user profiles on a ledger along with corresponding access policies;
   generate an intermediate representation for each user based on the verifiable ID scan image data and the encrypted user profile attributes;
   wherein the instructions further cause the processor to generate an alphanumeric special character string based on user profile data and to generate a shadow string of the alphanumeric special character string;
   wherein the shadow string includes in intermediate representation comprising QR code with a specified access policy; and
   wherein the instructions further cause the processor to generate a stripped shadow UWA and to send the stripped shadow UWA to a client, wherein the client performs a mutual authentication by using a subset of characters to get or post a request to the ID verification node.

2. The system of claim 1, wherein the instructions further cause the processor to generate a Digital Data Nucleic Authority (DDNA) to expose the user IDs that are genuine based on their country of residence.

3. The system of claim 1, wherein the instructions further cause the processor to generate encrypted user profile attributes including UWA numbers generated based on users' profile data.

4. The system of claim 1, wherein the instructions further cause the processor to extract user name from a profile to be matched with a user name of the verifiable ID scan image data.

5. The system of claim 1, wherein the instructions further cause the processor to decrypt shadow UWA M6 to M5 to confirm that the UWA has not been tampered with.

6. A method, comprising:
   acquiring, by an ID verification node, a verifiable ID scan image data of all users within a country of residence;
   receiving, by the ID verification node, users' profile data;
   generating, by the ID verification node, encrypted user profile attributes comprising DNA;
   executing, by the ID verification node, a transaction to store the encrypted user profiles on a ledger along with corresponding access policies;

generating an intermediate representation for each user based on the verifiable ID scan image data and the encrypted user profile attributes;
generating an alphanumeric special character string based on user profile data and to generate a shadow string of the alphanumeric special character string;
wherein the shadow string includes in intermediate representation comprising QR code with a specified access policy; and
further comprising generating a stripped shadow UWA and sending the stripped shadow UWA to a client, wherein the client performs a mutual authentication by using a subset of characters to get or post a request to the ID verification node.

7. The method of claim 6, further comprising generating a Digital Data Nucleic Authority (DDNA) to expose the user IDs that are genuine based on their country of residence.

8. The method of claim 6, further comprising generating encrypted user profile attributes including UWA numbers generated based on users' profile data.

9. The method of claim 6, further comprising decrypt shadow UWA M6 to M5 to confirm that the UWA has not been tampered with.

10. A non-transitory computer readable medium comprising instructions, that when read by a processor, cause the processor to perform:
acquiring a verifiable ID scan image data of all users within a country of residence;
receiving users' profile data;
generating encrypted user profile attributes comprising DNA;
executing a transaction to store the encrypted user profiles on a ledger along with corresponding access policies;
generating an intermediate representation for each user based on the verifiable ID scan image data and the encrypted user profile attributes;
generating an alphanumeric special character string based on user profile data and to generate a shadow string of the alphanumeric special character string;
wherein the shadow string includes in intermediate representation comprising QR code with a specified access policy; and
further comprising generating a stripped shadow UWA and sending the stripped shadow UWA to a client, wherein the client performs a mutual authentication by using a subset of characters to get or post a request to the ID verification node.

11. The non-transitory computer readable medium of claim 10, further comprising instructions, that when read by the processor, cause the processor to generate a Digital Data Nucleic Authority (DDNA) to expose the user IDs that are genuine based on their country of residence.

12. The non-transitory computer readable medium of claim 10, further comprising instructions, that when read by the processor, cause the processor to generate encrypted user profile attributes including UWA numbers generated based on users' profile data.

13. The non-transitory computer readable medium of claim 10, further comprising instructions, that when read by the processor, cause the processor to extract a first username from a profile to be matched with a second username of the verifiable ID scan image data.

* * * * *